US012632823B2

(12) United States Patent
Post et al.

(10) Patent No.: US 12,632,823 B2
(45) Date of Patent: May 19, 2026

(54) ORDER FULFILLMENT STATION OPERATION TIMER AND INDICATOR

(71) Applicant: Dematic Corp., Grand Rapids, MI (US)

(72) Inventors: Timothy C. Post, Grand Rapids, MI (US); Randall J. Carlson, Grand Rapids, MI (US); Tyler Forbush, Byron Center, MI (US); Collin R. Halamka, Jenison, MI (US); Andrew J. Kane, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 556 days.

(21) Appl. No.: 17/889,942

(22) Filed: Aug. 17, 2022

(65) Prior Publication Data

US 2023/0056919 A1     Feb. 23, 2023

Related U.S. Application Data

(60) Provisional application No. 63/234,051, filed on Aug. 17, 2021.

(51) Int. Cl.
*G06Q 10/08* (2024.01)
*G06Q 10/087* (2023.01)
*H04L 9/32* (2006.01)

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS 8,952,284 B1     2/2015 Wong et al.
10,127,514 B2 *  11/2018 Napoli ................ G06Q 10/083
(Continued)

FOREIGN PATENT DOCUMENTS

EP     3653541 A1     5/2020
WO     2020142385 A1    7/2020
WO     2020194154 A1   10/2020

OTHER PUBLICATIONS

International Search Report and Written Opinion from corresponding Patent Cooperation Treaty (PCT) Application No. PCT/IB2022/057719, completed Dec. 14, 2022.
(Continued)

*Primary Examiner* — Talia F Crawley
(74) *Attorney, Agent, or Firm* — Gardner, Linn, Burkhart & Ondersma LLP

(57) ABSTRACT
A time tracking and indicator system and method are provided for tracking and indicating initialization-to-completion times for order fulfilment operations, such as order packaging and shipping operations. The system includes a put-wall with multiple order storage locations and indicators at each of the storage locations. The indicators are independently addressable by a computer and may include color changeable lights and/or alphanumeric displays. The method and system provide visual prompts to an operator of the put-wall to indicate multiple statuses for an order at a particular storage location. Prompts include indications that (i) an order is ready to be attended to, (ii) an operation time limit has been exceeded, and (iii) that an operation for that location is exceedingly overdue. Time limits and prompts may be preset by a user or may be automatically set and adjusted by the computer based on historic operation completion times.

13 Claims, 4 Drawing Sheets

(56) References Cited

U.S. PATENT DOCUMENTS

| | | | | |
|---|---|---|---|---|
| 11,308,444 | B2 * | 4/2022 | Rongley | G05D 1/227 |
| 11,681,982 | B2 * | 6/2023 | Sikka | G06Q 10/087 |
| | | | | 705/28 |
| 11,836,672 | B2 * | 12/2023 | Lert, Jr. | H04W 4/35 |
| 11,893,535 | B2 * | 2/2024 | Jarvis | G05D 1/0297 |
| 12,014,321 | B2 * | 6/2024 | Rongley | G06Q 30/0255 |
| 12,056,640 | B1 * | 8/2024 | Manyam | G06Q 10/08 |
| 2006/0221082 | A1 | 10/2006 | Rifkin | |
| 2014/0156553 | A1 | 6/2014 | Leach et al. | |
| 2014/0350717 | A1 | 11/2014 | Dagle et al. | |
| 2015/0094840 | A1 | 4/2015 | Anderson | |
| 2015/0262115 | A1 | 9/2015 | Meulenberg et al. | |
| 2015/0294260 | A1 * | 10/2015 | Napoli | G06Q 10/083 |
| | | | | 705/337 |
| 2016/0253084 | A1 | 9/2016 | DeVille et al. | |
| 2018/0012289 | A1 | 1/2018 | Foster et al. | |
| 2018/0225795 | A1 * | 8/2018 | Napoli | G06Q 10/06316 |
| 2019/0035037 | A1 | 1/2019 | Chase et al. | |
| 2020/0198894 | A1 * | 6/2020 | Jarvis | G05D 1/0088 |
| 2020/0255219 | A1 | 8/2020 | Lert | |
| 2020/0302391 | A1 * | 9/2020 | Li | G06Q 10/0875 |
| 2020/0385211 | A1 * | 12/2020 | Yamashita | B65G 1/1378 |
| 2021/0012284 | A1 * | 1/2021 | Jarvis | G05D 1/0274 |
| 2022/0177227 | A1 * | 6/2022 | Khodl | G06Q 10/087 |
| 2023/0133964 | A1 * | 5/2023 | Gravelle | B65G 1/1378 |
| | | | | 700/216 |

OTHER PUBLICATIONS

European Search Report from co-pending European Patent Application No. 22857990.0, dated May 2, 2025.

* cited by examiner

| Device | Type | Order Fulfillment Warning Time(s) | Packout Exceeded Time(s) |
|--------|------|-----------------------------------|--------------------------|
| A | MaxiPICK | 600 | 900 |
| B | SinglePICK | 300 | 480 |
| C | SinglePICK | 300 | 480 |
| D | SinglePICK | 300 | 480 |
| E | SinglePICK | 300 | 480 |
| F | MaxiPICK | 600 | 900 |
| G | SinglePICK | 600 | 900 |
| H | SinglePICK | 600 | 900 |
| I | SinglePICK | 600 | 900 |
| J | SinglePICK | 600 | 900 |

ORDER FULFILLMENT STATION OPERATION TIMER AND INDICATOR

CROSS REFERENCE TO RELATED APPLICATION

The present application claims priority of U.S. provisional application Ser. No. 63/234,051 filed Aug. 17, 2021, which is hereby incorporated by reference herein in its entirety

FIELD OF THE INVENTION

The present invention is directed to methods and a system for fulfilling orders and, in particular, to a method and system for sorting items into individual orders for packing and shipping or for picking orders.

BACKGROUND OF THE INVENTION

Order fulfillment of orders placed over the Internet must take place within a relatively short period of time in order to be commercially competitive. The same could be said for orders received by phone, facsimile, or by the mail based on catalog or television-based merchandizing. Such order fulfillment is known as E-commerce and places demands on an order fulfillment system to meet such obligations. Order fulfillment is often times limited in terms of human operator efficiency as a function of order throughput defined by the amount of orders an operator processes or completes in a defined period of time. Put-walls or pack-walls are commonly utilized to consolidate orders in a centralized location to permit an operator to efficiently pick or retrieve items for orders with limited physical repositioning. Although put-walls funnel picking operations to a smaller area, operators may overlook or bypass certain orders for various reasons, including difficulty of handling the order or simple oversight on the operator's part.

SUMMARY OF THE INVENTION

The present invention provides a method and a system for providing visual prompts to an operator of a put-wall or other order fulfilment subsystem in order to improve efficiency and to ensure that an operator performs all of their required operations in a timely manner. The method and system track initialization-to-completion times for order packing operations from the time that the order is ready to be retrieved for packing. The method and system provide feedback to the operator to indicate that an order is ready to be attended to, that an order has been waiting for attention, and/or that an order is overdue for attention. The system includes selectively addressable multi-color lights and/or alphanumeric displays to provide visual prompts to the operator based on the tracked timers. The operator can acknowledge the system to indicate that they have completed the order operation, such as by extinguishing the indicator. The system may include preset timers and indicators, may be adjusted manually by an operator, or may be adjusted automatically to tailor the timers and indicators to the order fulfilment facility and operation to improve operator performance.

According to one form of the present invention, a method is provided for tracking initialization-to-completion times and indication timing statuses for order fulfilment operations, such as packing and shipping operations (i.e. packout operations). The method includes placing an order at a portion of an order fulfilment workstation, such as a put-wall or pack-wall, and illuminating an initial light source indicator to indicate to an operator that an order is initialized and ready for retrieval from the workstation. A computer counts or monitors an order initialization-to-completion time for the order beginning at the time that the initial indicator is illuminated. If the order is retrieved from the workstation, the operator acknowledges that the order has been retrieved and the initial indicator is extinguished. However, if the order is not retrieved from the workstation within an initial, predetermined timeframe, the computer illuminates a secondary light source indicator to indicate to the operator that an initial timeframe or operation time limit has expired.

In one aspect, the initial indicator and secondary indicator each include a colored light or may be part of a multi-color light system such that the initial indicator may be defined by one light color and the secondary indicator may be defined by a different light color. An alphanumeric display may be provided in addition to or as an alternative to the multi-color light system. The system and method may include multiple timers and indicators to direct and guide the operator. The indicators may flash or blink to further indicate or annunciate the need for operator attention.

In another aspect, if the order is not retrieved from the workstation within a secondary timeframe (after the initial timeframe has expired), the computer illuminates a tertiary light source indicator to indicate to an operator of the workstation that a secondary timeframe or operation time limit has expired.

In another form of the present invention, a time tracking and indicator system is provided for tracking and indicating the status of initialization-to-completion times for packout operations. The system includes a put-wall with several order storage locations. An indicator is provided at each storage location. Each indicator includes a light source and the light source is illuminated once an order at a particular storage location is initialized and ready to be retrieved by the operator (e.g. the light is illuminated in green, i.e. go). The system includes a computer to control the put-wall and indicators to track the time period between (i) when an order at a corresponding storage location is ready to be retrieved and (ii) either (a) when an operator retrieves the order from the storage location and acknowledges retrieval of the order or (b) when an operation time limit (defined by a time allotted to the operator for completing the order retrieval operation) has expired or been exceeded. If the operation time limit has been exceed, the computer illuminates or changes the light source at the particular storage location to a different color (e.g. from green to yellow, i.e. caution) if the operation time limit is exceeded before the operator retrieves, and acknowledges retrieval, of the order from the storage location.

In one aspect, the predetermined time interval is automatically selected by the computer as a function of an average initialization-to-completion time of order fulfilment operations performed by an operator operating the put-wall.

In another aspect, the light source includes a multi-color light having a multiple color options that are individually addressable and selectable by the computer. The light source may include an alphanumeric display in addition to or as an alternative to a multi-color light.

In yet another aspect, if the operation time limit expires before the operator retrieves and acknowledges retrieval of the order, the computer continues tracking the time between (i) the operation time limit and (ii) either (a) when an operator retrieves the order from the storage location and acknowledges retrieval of the order or (b) when a secondary time limit (defined by a time allotted to the operator for completing the order retrieval operation after the operation time limit has expired) has expired or been exceeded. If the secondary time limit is exceeded, the computer illuminates or changes the light source at the storage location to another, different color (e.g. from yellow to red).

Accordingly, the present invention provides a method and system for prompting an operator of a pack-wall of orders that require attention, including when an order is initialized and ready for attention, when an order has been waiting for attention, and when an order is overdue for attention. Such prompts improve operator efficiency by directing their actions and ensuring that all orders are attended to promptly in a timely manner.

These and other objects, advantages, purposes and features of this invention will become apparent upon review of the following specification in conjunction with the drawings.

DESCRIPTION OF THE PREFERRED EMBODIMENTS

Figure 1:
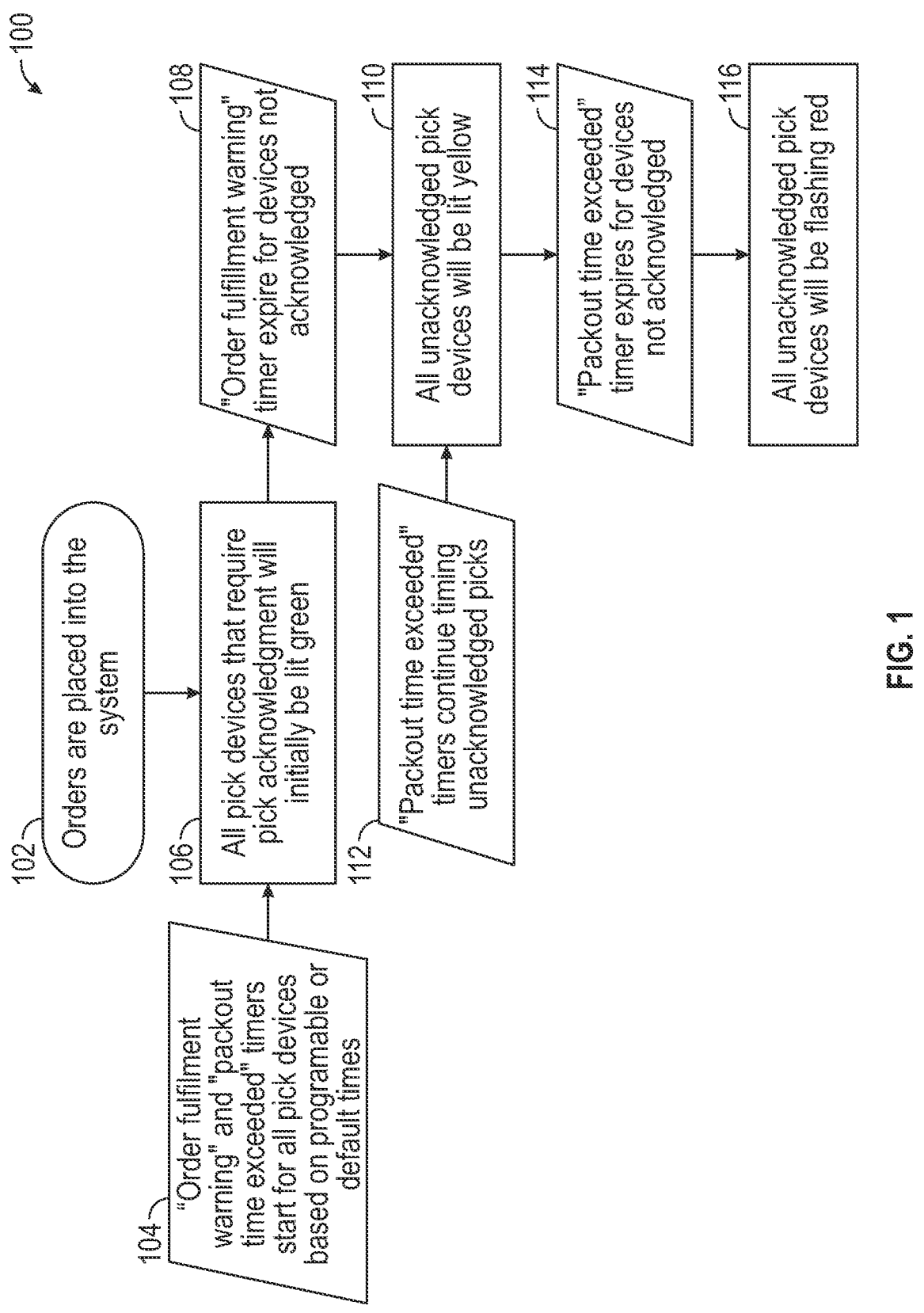
FIG. 1 is a diagram of a method for tracking and indicating an operation initialization-to-completion time for an order packing function, in accordance with the present invention.
Figures 2, 3:
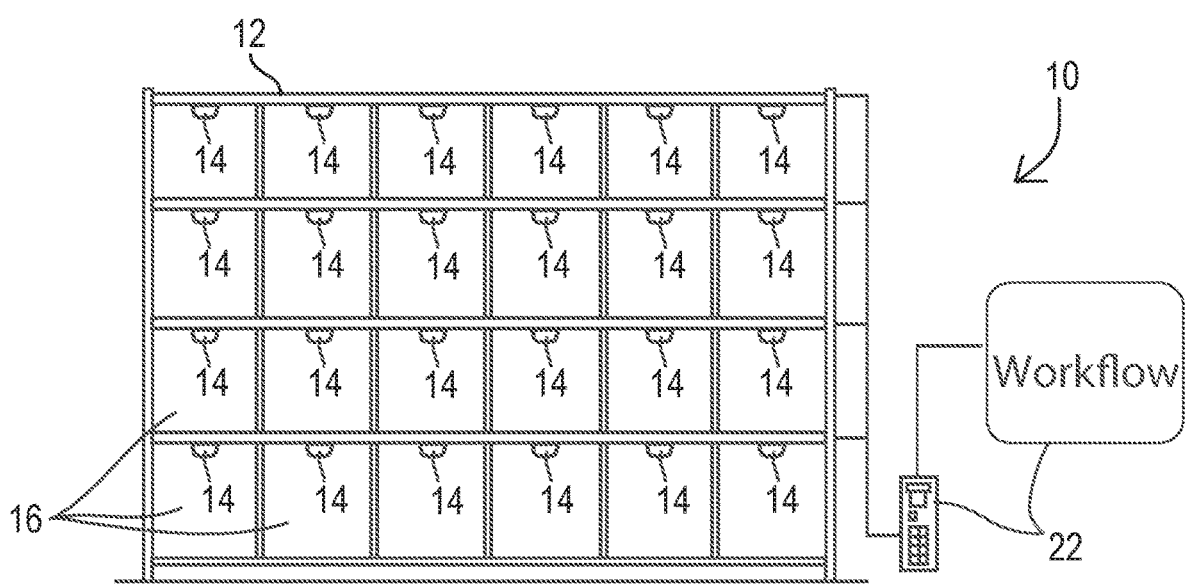
FIG. 2 is a front elevation view of an order fulfilment put-wall.
FIG. 3 is a table of exemplary time thresholds for initialization-to-completion of order packing operations corresponding to particular locations in an order-fulfilment facility.

Referring now to the drawings and the illustrative embodiments depicted therein, a system 10 and method 100 are provided for tracking the time an operator requires to complete an order fulfilment operation (e.g. order packing or packout) at a put-wall 12 and indicating to the operator the time status of the operation (FIGS. 1 and 2). The system 10 and method 100 instruct and guide the operator for order fulfilment operations. The system 10 includes pick-to-lights (PTL) 14 to indicate the location (e.g. storage location or cubby 16 of put-wall 12) where an operation is required and also indicates a status of the operation timer by illuminating a light source 18 and/or illuminating an alphanumeric display 20 (FIGS. 4A-6B). The system 10 and method 100 may significantly reduce or eliminate human factors that may negatively affect packout operations and/or other order fulfilment operations by providing time-sensitive location prompts to guide the operator. The system 10 and method 100 are particularly well-suited for packout and/or order item consolidation functions for tracking when an item has been retrieved from a particular location and the duration between when the operation was initialized and when an operator has completed that operation. Visual prompts may include colored lights 18, alphanumeric displays 20, flashing patterns, or other visual indication systems or arrangements. The parameters of the timers (e.g. operation initialization-to-completion time allotments) may be set by a user based on their desired operation times or the parameters may be automatically set by a control system or computer 22, such as a warehouse management system (WMS), for example.

Referring to the illustrative embodiment of FIG. 1, a visual (or otherwise indicatory) method 100 is provided for tracking operation times, such as initialization-to-completion times of a packout operation, and indicating the current time duration to an operator in an order fulfillment subsystem, such as a put-wall or pack-wall workstation 12, for example. To initialize the method 100, orders are placed 102 into the system 10. Order placement in the system may be initialized by a sensor at the put-wall determining that an item or items for an order have been placed at a storage location on the put-wall 12. The order placement may include upstream processes by which a computer system 22, such as a WMS, updates an order of fulfilment operations based on a list or database of pending orders. For instance, when a customer places an order via the internet or other method, the computer 22 may select a storage location 16 on the put-wall 12 to receive that customer's order and then direct that order via a transportation system to the selected storage location.

Once the order is placed 102 and initialized in the system 10, the computer 22 starts a timer and begins counting, monitoring, or tracking 104 the time from the initialization of the order. The time is tracked to either (i) when an operator retrieves the order from the put-wall 12 or (ii) the expiration of a predetermined amount of time (i.e. interval or time limit) allotted to the operator for completing the order retrieval operation. The method 100 can track multiple intervals, including an initial timeframe or interval in which the operator should complete the order retrieval. The interval (s) may be set by a user based on a desired initialization-to-completion time or the interval(s) may be set by the computer 22, such as by updating the interval times based on previous operation initialization-to-completion times at the put-wall 12, such as an average of previous times, for example.

Figures 4A, 4B, 4C:
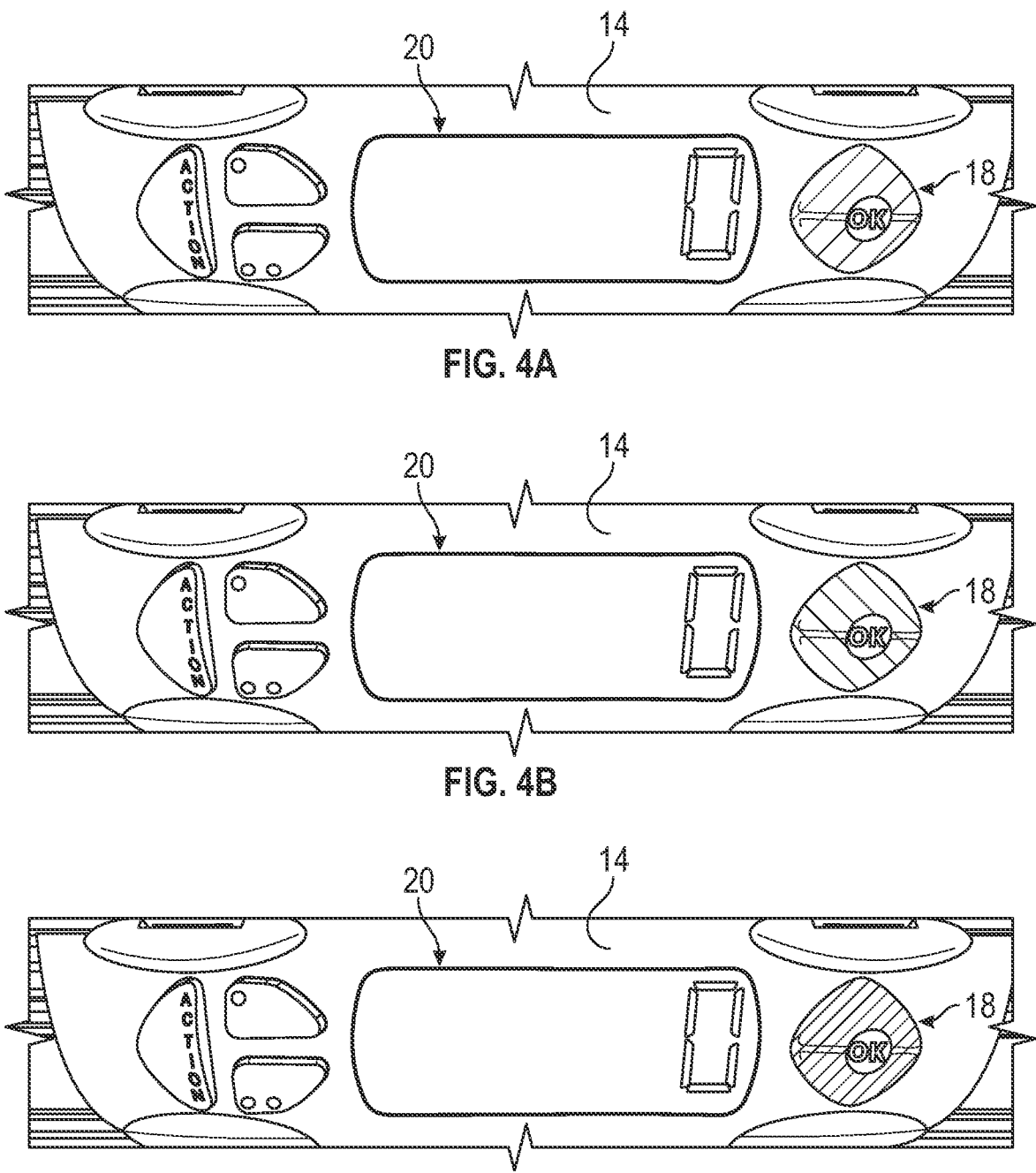
FIGS. 4A-4C are front perspective views of a pick-to-light (PTL), depicting sequential color indication changes based on respective elapsed initialization-to-completion times for order packing operations, in accordance with the present invention.

The computer 22 illuminates 106 an initial light source or indicator on a pick-to-light (PTL) 14 at the storage location 16 having the particular order. The initial indicator alerts or notifies an operator at the put-wall 12 that an order is initialized and ready to be retrieved from the corresponding storage location 16 (FIGS. 1 and 2). The PTL 14 may include multiple light sources and/or a selectable array 18 (see FIGS. 4A-4B) of light colors that can be selectively changed by the computer 22. In reference to the method embodiment of FIG. 1, the initial indicator is illuminated 106 in a first color, e.g. green for purposes of this disclosure (first color depicted as a first hatch pattern as shown in FIG. 4A), although any desired color may be chosen. If an operator does not retrieve the order (i.e. complete the operation) within an initial interval, the computer 22 determines 108 that an initial operation time limit has expired. The computer 22 then indicates that the initial operation time limit has been exceeded by illuminating 110 a secondary light source or indicator on the PTL 14 in a second color, e.g. yellow for purposes of this disclosure (second color depicted as a second hatch pattern as shown in FIG. 4B), although it will be appreciated that any color other than the color of the initial indicator may be chosen.

The computer 22 continues monitoring 112 the operation time as long as the order retrieval operation has not been completed. If the operator does not retrieve the order within a secondary operation time limit, the computer 22 determines 114 that a secondary operation time limit has also expired. The computer 22 then indicates that the secondary operation time limit has been exceeded by illuminating 116 a tertiary light source or indicator on the PTL 14 in a third color, e.g. red for purposes of this disclosure (third color depicted as a third hatch pattern as shown in FIG. 4C), although it will be appreciated that any color other than the color of the initial indicator and secondary indicator may be chosen. The PTL 14 may be operable to flash to provide additional indicatory feedback to the operator, such as when the end of a time interval is approaching or when an operation at one of the storage locations 16 is critical.

At any time during the operation timer period, the operator may acknowledge that they have retrieved the order from a particular storage location 16 and thus completed the required retrieval operation, such as by pressing a pick acknowledgement button, for example. The PTL 14 (regardless of the stage/interval of the operation) is extinguished upon the operator acknowledging the completion of the operation. The put-wall may be controlled by the computer 22 to begin timers for all PTL 14 of the storage locations 16 on the put-wall 12 such that the timers begin at the same time. Alternatively, the computer 22 may begin the timers for a PTL 14 of a storage location 16 independent of the other storage locations 16 once a full order has been placed and initialized at the particular storage location. In this manner, the computer 22 may constantly refresh or restart the timers for a particular storage location 16 as orders are retrieved and then replenished at that location.

An exemplary set of operation time limits for multiple workstations or devices are depicted in FIG. 3. As shown, each of the devices are configured for either multi-item order picking operations (i.e. "MaxiPICK") or single item order picking (i.e. "SinglePICK"). The order fulfillment warning time(s) represent an initial operation time limit and the packout exceeded time(s) represent a secondary operation time limit, such as defined above for method 100.

Referring to the illustrative embodiments of FIGS. 2 and 4A-6B, a time tracking and indicator system 10 is provided for tracking and indicating initialization-to-completion times for order fulfilment operations within an order fulfilment facility. The system 10 includes a put-wall 12 having multiple order storage locations 16 and an indicator, in the form of a pick-to-light (PTL) 14, at each of the of storage locations 16. A computer 22 controls the system 10 to track a time period that initiates when an order at a corresponding storage location 16 is ready to be retrieved. The computer 22 illuminates the light source 18 of the PTL 14 in a first indication color (e.g. green, FIG. 4A) once the order is initialized and ready for retrieval at a particular storage location 16. The time period may terminate based on a preset time interval or due to an action performed by the operator (see FIG. 3 for exemplary time intervals). For example, the timer may be preset to terminate (i) when an operator retrieves the order from the storage location 16 and acknowledges retrieval of the order or (ii) at the expiration of an operation time limit defined by a predetermined amount of time allotted to the operator for completing the order retrieval operation. For example, the predetermined time interval may be automatically selected by the computer as a function of an average initialization-to-completion time of order fulfilment operations performed by an operator operating the put-wall 12.

The computer illuminates the light source 18 at a particular storage location 16 in a secondary indication color (e.g. yellow, FIG. 4B; different color than that chosen for the initialization indication color) if the operation time limit is exceeded before the operator retrieves, and acknowledges retrieval, of the order from the storage location 16. If the operation time limit expires before the operator retrieves and acknowledges retrieval of the order, the computer 22 tracks the time between (i) the defined operation time limit and (ii) either (a) when an operator retrieves the order from the storage location 16 and acknowledges retrieval of the order or (b) at the expiration of a secondary time limit. For example, the secondary time limit may be defined by a predetermined amount of time allotted to the operator for completing the order retrieval operation after the operation time limit has expired. The computer 22 illuminates the light source 18 at the particular storage location 16 in a tertiary indication color (e.g. red, FIG. 4C; different color than that chosen for the initialization/first indication color and the secondary indication color) if the secondary time limit is exceeded prior to the operator retrieving and acknowledging retrieval of the order from the storage location 16. It will be appreciated that additional time limits or operation intervals and/or light source indications may precede, succeed, and/or coincide with the initial and secondary time limits and light source indications, as desired by a user. Thus, various configurations of timers and indicators may be provided to instruct and guide an operator of the put-wall 12.

Figures 5A, 5B, 6A, 6B:
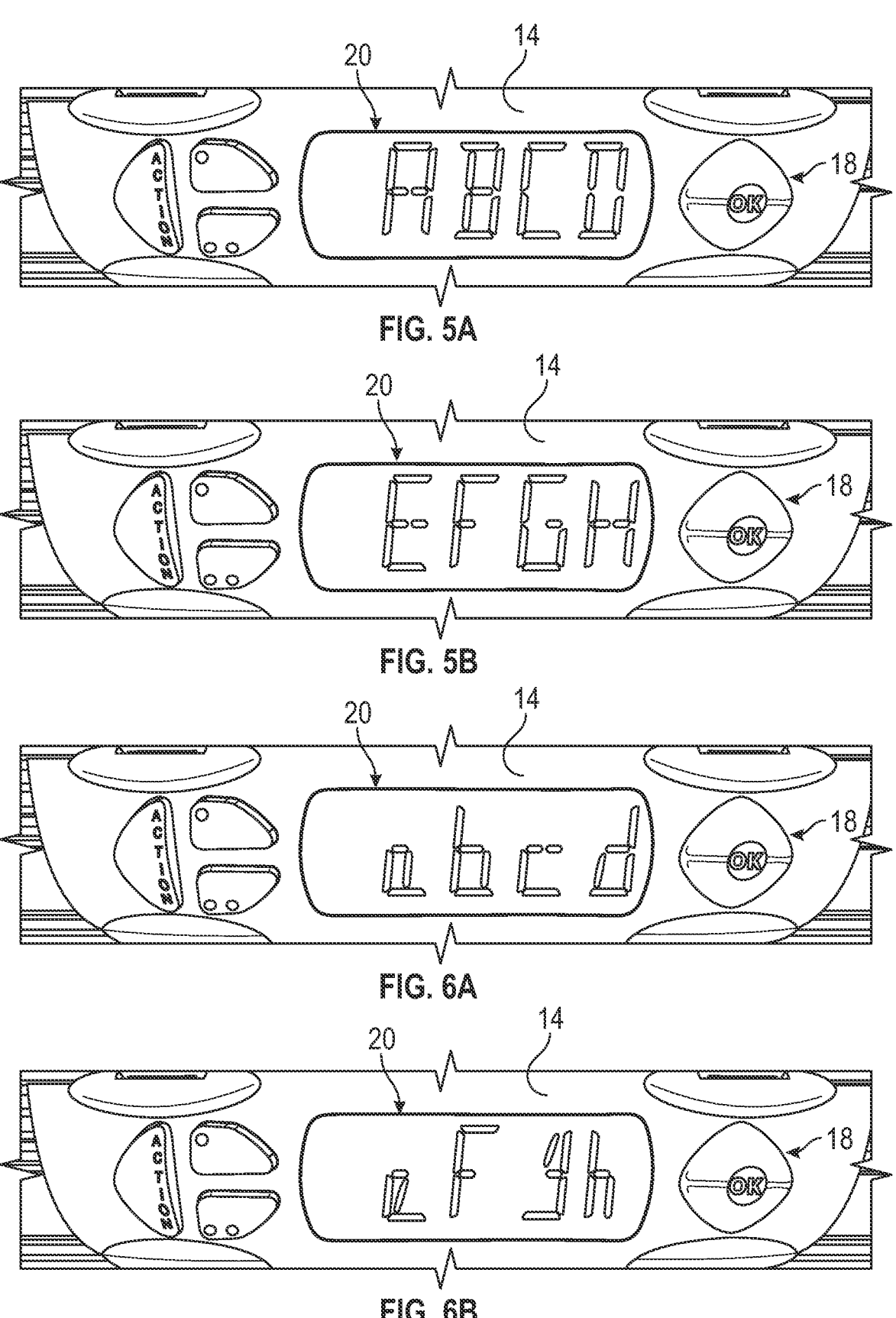
FIGS. 5A-5B are front perspective views of the PTL of FIGS. 4A-4C, depicting sequential alphanumeric messages in uppercase letters.
FIGS. 6A-6B are front perspective views of the PTL of FIGS. 4A-4C, depicting sequential alphanumeric messages in lowercase letters.

Referring to the illustrated embodiments of FIGS. 4A-6B, each PTL 14 includes a color changeable light source 18 (e.g. a multi-color light source or color selectable light array; see FIGS. 4A-4C) and a lighted alphanumeric display 20 (FIGS. 5A-6B). As mentioned previously, the PTL 14 may be operable to flash to provide additional indicatory feedback to the operator or to annunciate the indication. For example, when the end of a time interval is approaching or when an operation at one of the storage locations 16 is critical, the light source 18 may flash to better catch the operator's attention. The alphanumeric display 20 may illuminate a user defined message or pattern to indicate a particular operation that is required, such as indication of the number of items at a particular storage location 16 that are to be retrieved for an order, for example. The alphanumeric display 20 may be functional to display uppercase letters as illustrated in FIGS. 5A-5B and/or the alphanumeric display 20 may be functional to display lowercase letters as illustrated in FIGS. 6A-6B. While only letters A-H and a-h are depicted in respective FIGS. 5A-5B and 6A-6B, it will be appreciated that the alphanumeric display 20 may be functional to display all letters of the modern English alphabet, as well as letters or characters of other alphabets, if desired. The alphanumeric display 20 may also be functional to display shapes or patterns, such as dots, dashes, square, rectangles, triangles, etc., for example. While the PTL 14 of FIGS. 4A-6B includes both a color changeable light source 18 and a lighted alphanumeric display 20, it will be appreciated that the indicator of system 10 may include only one of a color changeable light source 18 or an alphanumeric display, if desired, without substantially affecting the functionality of the PTL 14.

For example, newly available orders would be indicated with a PTL display that is lit green (FIG. 4A). The PTL display system includes two configurable timers, a first timer and a second timer. It will be appreciated that additional timers may be configured to provide additional feedback to the operator. The timers may be set with default time duration settings during the manufacture or building of each of the PTL displays. When the first timer "Order Fulfilment Warning" has expired the display light will illuminate in yellow (changed from green; FIG. 4B). When the second timer "Packout Time Exceeded" has expired the display light will illuminate in red (changed from yellow; FIG. 4C).

The indicatory manner of the PTL timer system prompts operators to pack orders in a directed manner, instead of an opportunistic manner, which may occur if they operator is left to determine the operation order. In short, operators may be less likely to avoid time consuming or challenging order packing in lieu of packing shorter or less challenging orders first, as the operator may prefer to do. The computer 22 may track data in the form of historic order fulfillment operation completion times based on various parameters. For example, completion time data may be tracked by required package type (e.g. bag, box, custom packaging, etc.). Data may be harvested or analyzed to operate an order-fulfilment facility in a more efficient manner, such that particular order types (e.g. single item, multi-item, bulky, etc.) may be grouped together and then directed to a dedicated put-wall. For example, intricate, non-uniformly shaped, or otherwise difficult to pack orders may be grouped together and directed to a put-wall where operators are prepared to handle and pack such orders.

Thus, embodiments are provided for a system and method of tracking operation initialization-to-completion times and indicating the timing status of a particular order. The system and method provide visual prompts to an operator to ensure that the operator performs all required operations in a timely manner. The system is configurable to user-defined time intervals and/or the system may automatically set time intervals based on historic operation completion times. The system utilizes color changeable lights and/or alphanumeric displays to prompt the operator that certain operations are required at a particular location or to indicate that a particular operation is in need of attention.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A time tracking and indicator system for tracking and indicating initialization-to-completion times for order fulfilment operations by human operators, said system comprising:

a put-wall comprising a plurality of order storage locations;

an indicator disposed proximate each of said plurality of storage locations, each of said indicators comprising a light source; and a computer in communication with said put-wall and said indicators and configured to track a time period defined between (i) when an order at a corresponding storage location is ready to be retrieved and (ii) either chosen from (a) when an operator retrieves the order from said storage location and acknowledges retrieval of the order or (b) an operation time limit defined by a predetermined amount of time allotted to the operator for completing the order retrieval operation;

said computer configured to illuminate said light source at a particular storage location when said operation time limit is exceeded prior to the operator retrieving and acknowledging retrieval of the order from the storage location.

2. The system of claim 1, wherein said predetermined amount of time is automatically selected by said computer as a function of an average initialization-to-completion time of order fulfilment operations performed by an operator operating said put-wall.

3. The system of claim 1, wherein each said light source comprises a multi-color light comprising a plurality of colors selectively operable by said computer.

4. The system of claim 1, wherein if said operation time limit expires before the operator retrieves and acknowledges retrieval of the order, said computer is configured to track a second time period defined between (i) said operation time limit and (ii) either chosen from (a) when an operator retrieves the order from said storage location and acknowledges retrieval of the order or (b) a secondary time limit defined by a predetermined amount of time allotted to the operator for completing the order retrieval operation after the operation time limit has expired.

5. The system of claim 4, wherein each said light source comprises a multi-color light comprising a plurality of colors selectively operable by said computer, and wherein said computer is configured to illuminate said light source at the particular storage location in a different color if said secondary time limit is exceeded prior to the operator retrieving and acknowledging retrieval of the order from the storage location.

6. The system of claim 5, wherein each of said indicators further comprises a display operable to project alphanumeric messages, wherein said computer is configured (i) to cause a first alphanumeric message to be projected by said display at the particular storage location if said operation time limit is exceeded prior to the operator retrieving and acknowledging retrieval of the order from the storage location and (ii) to cause a second alphanumeric message to be projected by said display at the particular storage location if said secondary time limit is exceeded prior to the operator retrieving and acknowledging retrieval of the order from the storage location.

7. The system of claim 1, wherein each of said indicators further comprises a display operable to project alphanumeric messages, and wherein said computer is configured to cause an alphanumeric message to be projected by said display at the particular storage location if said operation time limit is exceeded prior to the operator retrieving and acknowledging retrieval of the order from the storage location.

8. A time tracking and indicator system for tracking and indicating initialization-to-completion times for order fulfilment operations by human operators, said system comprising:

a work station comprising a plurality of order storage locations;

an indicator disposed proximate each of said plurality of storage locations, each of said indicators comprising a light source; and a computer in communication with said work station and said indicators and configured to track a time period at each of said storage locations defined between (i) when an order at a particular one of said storage locations is ready to be retrieved and (ii) either chosen from (a) when an operator retrieves the order from said particular storage location and retrieval of the order is confirmed or (b) an operation time limit defined by a predetermined amount of time allotted to the operator for completing retrieval of the order;

said computer configured to illuminate said light source at the particular storage location when said operation time limit is exceeded prior to the operator retrieving the order and retrieval of the order from the particular storage location is confirmed.

9. The system of claim 8, wherein a time period between when an order at one of said storage locations is ready to be retrieved and when an operator retrieves the order and retrieval of the order from the said storage location is confirmed defines an order initialization-to-completion time, and wherein said computer is configured to track a plurality of said order initialization-to-completion times and said predetermined amount of time is automatically selected by said computer as a function of an average of said plurality of said initialization-to-completion times.

10. The system of claim 8, wherein retrieval of the order is confirmed by the operator.

11. The system of claim 8, wherein each said light source comprises a multi-color light comprising a plurality of colors selectively operable by said computer;

wherein if said operation time limit expires before the operator retrieves the order and retrieval of the order is confirmed, said computer is configured to track a second time period defined between (i) said operation time limit and (ii) either chosen from (a) when an operator retrieves the order from the particular storage location and retrieval of the order is confirmed or (b) a secondary time limit defined by a predetermined amount of time allotted to the operator for completing the order retrieval operation after the operation time limit has expired; and wherein said computer is configured to illuminate a first color at said light source at the particular storage location if said operation time limit is exceeded prior to the operator retrieving the order and retrieval of the order is confirmed, and is configured to illuminate a second light color at said light source at the particular storage location if said secondary time limit is exceeded prior to the operator retrieving the order and retrieval of the order is confirmed.

12. The system of claim 11, wherein each of said indicators further comprises a display operable to project alphanumeric messages, wherein said computer is configured (i) to cause a first alphanumeric message to be projected by said display at the particular storage location if said operation time limit is exceeded prior to the operator retrieving the order and retrieval of the order is confirmed and (ii) to cause a second alphanumeric message to be projected by said display at the particular storage location if said secondary time limit is exceeded prior to the operator retrieving the order and retrieval of the order is confirmed.

13. The system of claim 8, wherein each of said indicators further comprises a display operable to project alphanumeric messages, and wherein said computer is configured to cause an alphanumeric message to be projected by said display at the particular storage location if said operation time limit is exceeded prior to the operator retrieving the order and retrieval of the order is confirmed.

* * * * *